United States Patent
Lahlum et al.

(10) Patent No.: US 6,912,406 B2
(45) Date of Patent: Jun. 28, 2005

(54) APPARATUS FOR MULTIPLE BAND COMMUNICATION

(75) Inventors: Ross Lahlum, Mount Prospect, IL (US); Randy Wiessner, Palatine, IL (US)

(73) Assignee: Motorola Inc., Schaumburg, IL (US)

( * ) Notice: Subject to any disclaimer, the term of this patent is extended or adjusted under 35 U.S.C. 154(b) by 93 days.

(21) Appl. No.: 10/074,969

(22) Filed: Feb. 13, 2002

(65) Prior Publication Data

US 2003/0153348 A1 Aug. 14, 2003

(51) Int. Cl.[7] .............................................. H04M 1/00
(52) U.S. Cl. ........................ 455/553.1; 455/552.1; 455/78; 455/73
(58) Field of Search ............................. 455/550.1, 69, 455/552.1, 553.1, 436, 437, 78, 83, 73; 333/132; 370/297

(56) References Cited

U.S. PATENT DOCUMENTS

| | | | | |
|---|---|---|---|---|
| 5,414,214 A | * | 5/1995 | Cho et al. .................... | 174/52.3 |
| 5,815,804 A | * | 9/1998 | Newell et al. ................. | 455/78 |
| 6,069,925 A | * | 5/2000 | Koh ............................. | 375/344 |
| 6,201,952 B1 | * | 3/2001 | Shimizu et al. ........... | 455/180.1 |
| 6,487,410 B1 | * | 11/2002 | Kontio et al. ................ | 455/437 |
| 2003/0008660 A1 | * | 1/2003 | Forrester ...................... | 455/456 |

* cited by examiner

Primary Examiner—Lee Nguyen
Assistant Examiner—Lewis West
(74) Attorney, Agent, or Firm—Matthew C. Loppnow

(57) ABSTRACT

A mobile communication device that includes an antenna configured to send and/or receive a first signal in a first frequency band and a second signal in a second frequency band, first receiver circuitry configured to receive signals in the first frequency band, a switch having a first position, and a first diplexing network coupled to the antenna, the first diplexing network also coupled to the switch, and first diplexing network also coupled to the first receiver circuitry. The first diplexing network can be configured to pass signals in the first frequency band to the first receiver circuitry and to block signals in the second frequency band from the first receiver circuitry. The first diplexing network can also be configured to pass signals in the second frequency band to the switch. The mobile communication device can also include a second diplexing network coupled to the switch at the first position, the second diplexing network corresponding to the second frequency band.

18 Claims, 2 Drawing Sheets

| SWITCH POS. | SELECTION | Vcc REF | EQUATION |
|---|---|---|---|
| 1 | WCDMA Tx + GSM Rx | 5 | G' * (A+E) |
| 2 | PCS Rx | 5 | D * (G*(A+E)) |
| 3 | DCS Tx + PCS Tx | 5 | F |
| 4 | GSM Tx + DCS Rx | 5 | C + (D'*(G*(A+E))) |

APPARATUS FOR MULTIPLE BAND COMMUNICATION

BACKGROUND OF THE INVENTION

1. Field of Invention

The present invention is directed to a method and apparatus for multiple band communication. In particular, the present invention is directed to a mobile communication device that can access multiple systems simultaneously.

2. Description of Related Art

Presently, the emergence of 3rd Generation and higher mobile wireless communications systems creates a need for mobile communications handsets capable of accessing multiple communications systems, for example GSM and WCDMA communications systems serving a common geographical area. The full exploitation of the services of multiple communication systems requires that multi-mode wireless mobile communications devices operate simultaneously on more than one communication system and transition efficiently between communication systems without significant performance degradation.

Unfortunately, present multi-mode and multi-band wireless communications are incapable of accessing more than one communication system simultaneously. For example, the continuous receive and transmit nature of CDMA communications leaves no time for monitoring other communication systems as required for multimode operation such as, for example, assessing hand-off candidates.

Compression of the transmission of downlink and uplink information in continuous receive and transmit communications systems can create time for monitoring other communication systems. During such compression, more data is transmitted over shorter time intervals to avoid a reduction in the data rate. Unfortunately, transmission compression requires more power, resulting in increased burdens on system capacity. Furthermore the software to implement this compression may require more resources from the processor and memory, adding complexity to the design and also decreasing talk time.

Also, any attempts at present multi-mode and multi-band wireless communications without compression require multiple antennas. Unfortunately, additional antennas increase the cost, size, and complexity of a portable communication device.

The various aspects, features and advantages of the present invention will become more fully apparent to those having ordinary skill in the art upon careful consideration of the following Detailed Description of the Invention with the accompanying drawings described below.

SUMMARY OF THE INVENTION

The invention provides a mobile communication device. The mobile communication device can include an antenna configured to receive a first signal in a first frequency band and a second signal in a second frequency band, first receiver circuitry configured to receive signals in the first frequency band, a switch having a first position, and a first diplexing network coupled to the antenna, the first diplexing network also coupled to the switch, and first diplexing network also coupled to the first receiver circuitry. The first diplexing network can be configured to pass signals in the first frequency band to the first receiver circuitry and to block signals in the second frequency band from the first receiver circuitry. The first diplexing network can also be configured to pass signals in the second frequency band to the switch. The mobile communication device can also include a second diplexing network coupled to the switch at the first position, the second diplexing network corresponding to the second frequency band.

One aspect of the present invention allows the elimination of an extra internal antenna and RF connector that previously must be used for monitoring extra frequency bands without compression. Another aspect of the present invention allows extra board space to be opened up in a mobile communication device and the size of a mobile communication device to be reduced because of reduced amounts of components. Another aspect of the present invention allows the use of a single antenna for automobile usage. Another aspect of the present invention allows for an improvement in mobile communication performance along with other benefits.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
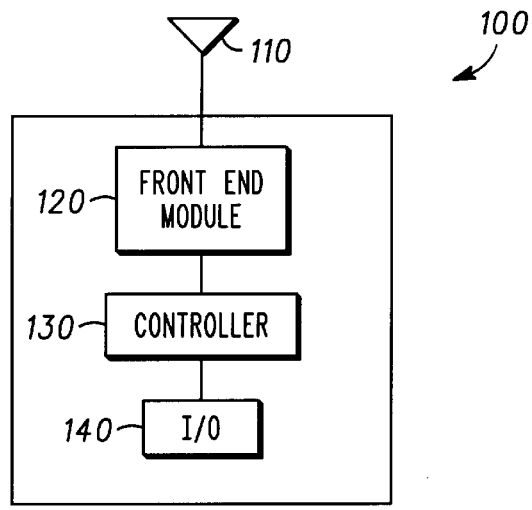
FIG. 1 is an exemplary block diagram of a mobile communication device according to a first embodiment.

FIG. 1 is an exemplary block diagram of a mobile communication device 100 according to a first embodiment. The mobile communication device 100 may be any type of wireless communication device, such as a mobile telephone, a mobile pager, or the like. The mobile communication device 100 can include an antenna 110, a front end module 120, and input/output circuitry 140. The antenna 110 may be internal or external to the mobile communication device 100. In operation, the antenna 110 sends and/or receives mobile communication signals in at least one frequency band. The front end module 120 monitors another frequency band and can switch the mobile communication device into operation in the other frequency band depending on system availability in each frequency band. The controller 140 controls the operation of the components of the mobile communication device 100. For example, the controller 140 can include a microprocessor, data memory, program memory, and/or control logic for implementing software and controlling the operation of the components of the mobile communication device 100. The input/output circuitry 140 can act as a user interface for receiving and sending signals to the user of the mobile communication device 100. For example, the input/output circuitry 140 can send and/or receive audio, visual, or other sensory signals to a user. The front end module 120 can be implemented on a multilayer low-temperature cofired ceramic (LTCC) module. This module 140 can provide band selection and filtering between EGSM, DCS, PCS, and WCDMA receive and transmit bands in third generation phones.

Figure 2:
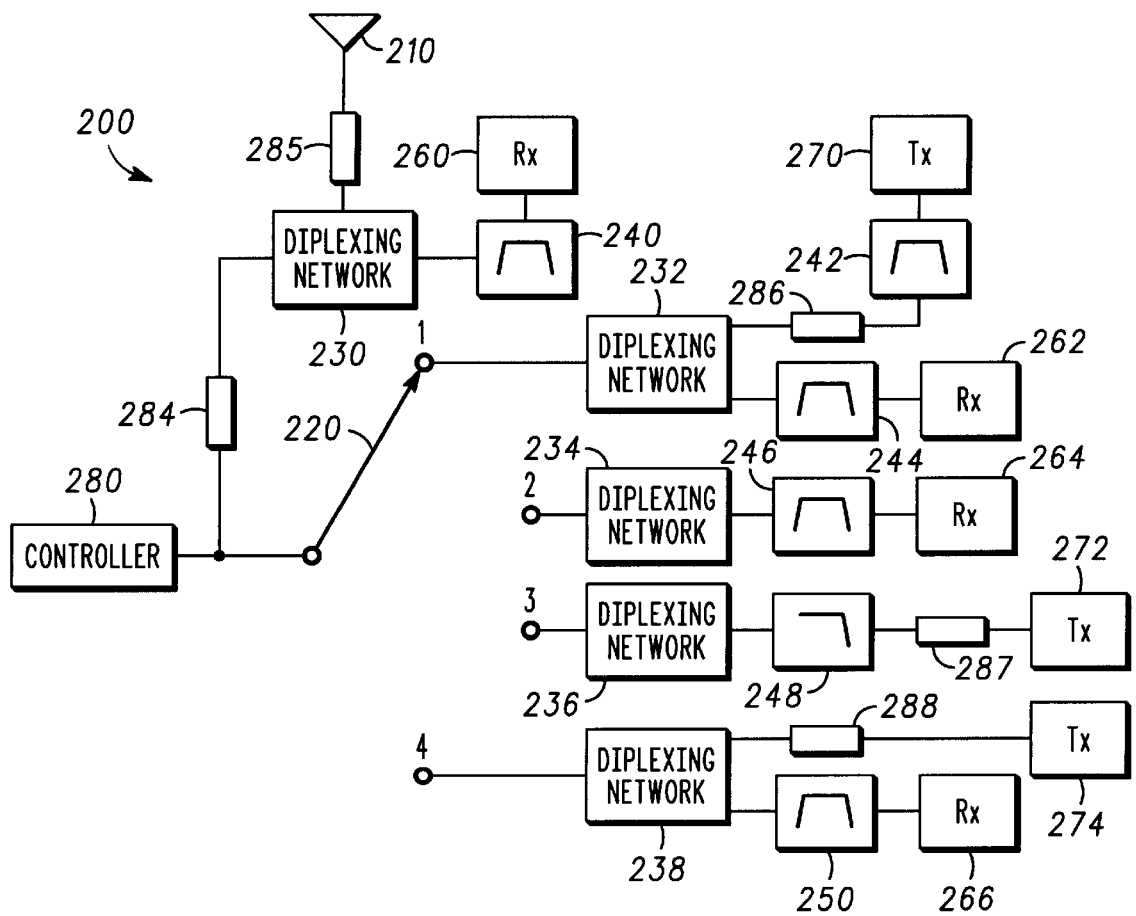
FIG. 2 is an exemplary block diagram of a mobile communication device according to another embodiment.

FIG. 2 is an exemplary block diagram of a mobile communication device 200 according to another embodiment. All of the components aside from the antenna 210 of the mobile communication device 200 may comprise the front end module 120 of FIG. 1. The mobile communication device 200 can include an antenna 210, a switch 220, diplexing networks 230, 232, 234, 236, and 238, filters 240, 242, 244, 246, 248, and 250, receiver circuitry or receivers 260, 262, 264, and 266, transmitter circuitry or transmitters 270, 272, and 274, and a controller 280.

The switch 220 can have up to and at least four positions 1, 2, 3, and 4 depending on the number of modes of operation and the number of different systems to be accessed by the mobile communication device 200. The switch 220 may be a 4-position GaAs FET antenna switch. DC blocking capacitors may be used with the switch 220 to counteract any DC bias that may exist on the RF ports of the switch 220.

The antenna 210 may be internal or external to the mobile communication device 200. Also, the signal sent and/or received from the antenna 210 may be fed via a transmission line 285, through the diplexing network 230 and the transmission line 284 before reaching the switch 220. The filters 240, and 242 may be ceramic filters or multilayer LC filters. The filters 244, 246, and 250 may be SAW filters. The filter 246 may be a multilayer LC filter.

The receiver 260 may be a WCDMA receiver. The receiver 262 may be a GSM900 (or EGSM) receiver. The receiver 264 may be a PCS receiver. The receiver 266 may be a DCS receiver. The transmitter 270 may be a WCDMA transmitter. The transmitter 272 may be a DCS and a PCS transmitter. The transmitter 274 may be a GSM900 (or EGSM) transmitter. The filters 240, 242, 244, 246, and 250 may be band pass filters. The filter 248 may be a low pass filter. The diplexing networks 230, 232, 234, 236, and 238 may comprise an LC circuit, an LC phase shift circuit, an LC resonating circuit, transmission lines, and the like. The diplexing networks 230, 232, 234, 236, and 238 may also include a dedicated diplexer for diplexing signals in different frequency bands.

The lines connecting the various components of the mobile communication device 200 may include transmission lines 284–288. Additional transmission lines and filters may be inserted between the components to obtain various impedances for tuning the characteristics of the mobile communication device 200. For example, the mobile communication device 200 utilizes the out-of-band impedance of the components in each path together with appropriate phase shifts to rotate each path's impedance to an open at the relevant frequency. Thus, for example, the receiver 260 can actively monitor for the availability of a base station in a first frequency band while a call is in progress in any other band selected by the switch 220. Once the presence of a base station in the first frequency band is detected by the receiver 260, a handoff decision can be made by software in the controller 280 to switch to a system utilizing the base station in the first frequency band.

Other types receivers, transmitters, diplexing networks, and filters for other systems may be substituted for those disclosed and those disclosed may be interchanged and rearranged to create different configurations for reception and transmission on different systems.

In operation, the mobile communication device 200 can operate in up to and at least four modes of operation. These modes include each of a first frequency band call mode, a second frequency band call mode, a third frequency band call mode, and a fourth frequency band call mode. These frequency band call modes can correspond to systems such as WCDMA, GSM900, PCS, DCS, and any other mobile communication systems. The antenna 210 can send and/or receive signals in the various frequency bands.

In all of the call modes the receiver 260 acts as a receiver for a first frequency band, such as WCDMA, which uses a full duplex call mode. The diplexing network 230 acts as an open circuit to frequency bands other than a reception band in the first frequency band. The filter 240 acts as a band pass filter for a reception band in the first frequency band and provides spurious response rejection. Thus, the receiver 260 always monitors for a system in the first frequency band regardless of the current mode of operation and system used.

In the first mode of operation, such as WCDMA, the switch 220 is at a first position 1. Signals are transmitted in the first frequency band by the transmitter 270 and are received in the first frequency band by the receiver 260. In particular, the transmitter 270 transmits signals in the first frequency band through the band pass filter 242. The diplexing network 232 matches a path to a transmit band in the first frequency band and can act as an open circuit for a reception band in the first frequency band. The diplexing network 232 can also act as an open circuit for other frequency bands. The diplexing network 232 also diplexes signals in the first frequency band transmitted from the transmitter 270 with signals in the second frequency band received by the receiver 262.

Thus, in order to allow the use of one antenna for all four transmit and receive bands, the illustrated special diplexing arrangement is used. The diplexing networks 230, 232, 234, 236, and 238 act in conjunction with the switch 220 so that, whichever path is selected, signals in a first frequency receive band will be presented with an open circuit after the switch 220. Signals in this band are then reflected back through the filter 240 to the first frequency receive band receiver 260.

In the first mode of operation according to a similar exemplary embodiment, signals received at the antenna 210 between 2110–2170 MHz will see any path through the switch 220 as an open circuit due to the characteristics of the diplexing networks 232, 234, 236, and 238. Thus, WCDMA receive signals will only go through the diplexing network 230 and a WCDMA bandpass filter 240 to a WCDMA receiver 260. The diplexing network 230 may be a network or simply a diplexing point picked off the transmission line 285 from the antenna 210 with a suitable phase shift from the filter 240 provided by the transmission line 284. Due to the out-of-band impedance of the filter 240, the phase rotation provided by the transmission line 284, and other related impedances, signals in other frequency bands will see the filter 240 as an open circuit, preventing them from reaching the WCDMA receiver 260. The filter 240 may then have an out-of-band impedance characteristic in order for the diplexing arrangement to work properly. This impedance characteristic can be determined depending on impedances and phase shifting of all of the components of the mobile communication device 200. This characteristic may also be obtained from specifications relating to mobile communications devices.

For transmission in the first mode of operation according to another exemplary embodiment, transmission is done in a WCDMA transmission band between 1920–1980 MHz at switch position 1. Signals from the WCDMA transmitter 270 pass through a WCDMA transmission bandpass filter 242, then through the diplexing network 232 which isolates them from the filter 244 and receiver 262 while allowing them to pass to the antenna 210 when the switch 220 is in position 1. The transmission line 286 provides a phase shift between networks inside the mobile communication device 200 or front end module 120 and the filter 242. This may represent the line length between the front end module 120 and the filter 242 and can be taken into account in the overall diplexing arrangement, along with the out-of-band impedance of the filter 242. As with the WCDMA receiving path, the filter 242 may have a controlled out-of-band impedance characteristic for optimal operation of the diplexing arrangement based on interaction with other components and established specifications for such systems.

In the second mode of operation, such as GSM900, the switch 220 alternates between the first position 1 and a fourth position 4 depending on whether the mobile communication device is receiving or transmitting. Signals are transmitted in the second frequency band by the transmitter 274 and are received in the second frequency band by the receiver 262. In particular, the transmitter 274 transmits signals in the first frequency band through the diplexing network 238. The diplexing network 238 matches a path to a transmit band in the second frequency band and can act as an open circuit for a reception band in the second frequency band. The diplexing network 238 can also act as an open circuit for other frequency bands. The receiver 262 receives signals in a reception band in a second frequency band from the antenna 210 through the diplexing network 232 and the bandpass filter 244. The diplexing network 232 matches a path to a reception band in the second frequency band and can act as an open circuit for other frequency bands.

For reception in the second mode of operation according to another exemplary embodiment, reception is done for EGSM or GSM900 in a reception band between 925–960 MHz at switch position 1. With the switch 220 in position 1, signals arriving at the antenna 210 in the EGSM receive band pass through the diplexing network 232 to the EGSM filter 244. The diplexing network 232 also provides attenuation at the WCDMA transmission frequencies to protect the filter 244 from transmit power from the transmitter 270. The diplexing network 232 also provides small isolation from transmit power when the switch is in position 3 or position 4 if the switch isolation alone is insufficient to protect the filter 244.

For transmission in the second mode of operation according to another exemplary embodiment, transmission is done for EGSM in a transmission band between 880–915 MHz at switch position 4. Signals from the EGSM transmitter 274 pass through the diplexing network 238, which protects the DCS receiver filter 250 from transmit power while allowing the EGSM transmission signal to pass to the antenna when the switch 220 is in the fourth position. A EGSM harmonic filter may also be used separately, or the function may be performed by a stopband characteristic of the diplexing network 238. The transmission line 288 represents the transmission line length between the EGSM transmitter 274 and a EGSM transmit pin on the front end module 120.

In the third mode of operation, such as PCS, the switch 220 alternates between the second position 2 and a third position 3 depending on whether the mobile communication device is receiving or transmitting. Signals are transmitted in the third frequency band by the transmitter 272 and are received in the third frequency band by the receiver 264. In particular, the transmitter 272 transmits signals in the third frequency band through the low pass filter 248 and the diplexing network 236. The diplexing network 236 matches a path to a transmit band in the third frequency band and can act as an open circuit for other frequency bands. The receiver 264 receives signals in a reception band in a third frequency band from the antenna 210 through the diplexing network 234 and the bandpass filter 246. The diplexing network 234 matches a path to a reception band in the third frequency band and can act as an open circuit for other frequency bands.

For reception in the third mode of operation according to another exemplary embodiment, reception is done in a PCS reception band between 1930–1990 MHz at switch position 2. With the switch 220 at position 2, signals arriving at the antenna 210 in the PCS receive band pass through diplexing network 234 to the PCS receiver filter 246. This position of the switch is not duplexed with a transmit path, so the network may be simpler than others. Like the other receive paths, however, sufficient attenuation at the other transmit frequencies is needed to protect the filter 246 from transmit power unless switch isolation is adequate.

In the fourth mode of operation, such as DCS, the switch 220 alternates between the fourth position 4 and a third position 3 depending on whether the mobile communication device is receiving or transmitting. Signals are transmitted in the fourth frequency band by the transmitter 272 and are received in the fourth frequency band by the receiver 266. In particular, the transmitter 272 transmits signals in the fourth frequency band through the diplexing network 236. The diplexing network 236 matches a path to a transmit band in the fourth frequency band and can act as an open circuit for other frequency bands. The receiver 266 receives signals in a reception band in a fourth frequency band from the antenna 210 through the diplexing network 238 and the bandpass filter 250. The diplexing network 238 matches a path to a reception band in the fourth frequency band and can act as an open circuit for other frequency bands. The diplexing network 238 also diplexes signals in the second frequency band transmitted from the transmitter 274 with signals in the fourth frequency band received by the receiver 266.

For reception in the fourth mode of operation according to another exemplary embodiment, reception is done in the DCS receive band between 1805–1880 MHz at switch position 4. With the switch at position 4, signals arriving at the antenna 210 in the DCS receive band pass through the diplexing network 238 to the DCS filter 250. The diplexing network 238 also provides attenuation to protect the filter 250 from EGSM transmit power from the transmitter 274.

For transmission in both the third mode of operation and the fourth mode of operation, according to another exemplary embodiment, transmission is done in DCS and PCS transmission bands between, respectively, 1710–1785 MHz and 1850–1910 MHz at switch position 3. When the switch 220 is in position 3, signals from the DCS/PCS transmitter 272 pass through the filter 248 and the diplexing network 236 to the antenna 210. The filter 248 may be a low pass filter, a transmit harmonic filter, a notch filter, or the like. However, required harmonic attenuation of the transmitter 272 may also be provided by a stopband characteristic of the diplexing network 236. The filter 248 can attenuate thermal noise in the WCDMA receiver band coming from the DCS/PCS transmitter 272 and forms part of the overall diplexing network along with a phase shift provided by the transmission line 287. This attenuation protects the WCDMA receiver 260 from desense while transmitter 272 is operating. As with the WCDMA receive and transmit bandpass filters 240 and 242, the transmission line outofband impedance should be controlled for the proper operation of the diplexing arrangement which may be determined from system specifications.

Figures 3, 4:
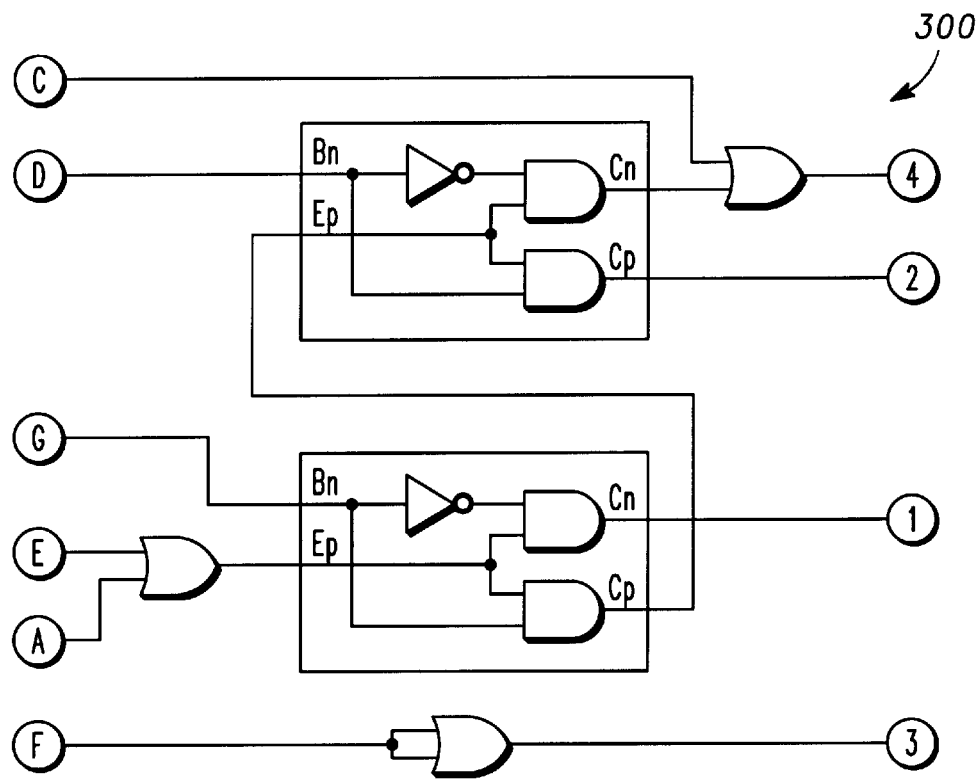
FIG. 3 is an exemplary illustration of controlling logic for a switch.
FIG. 4 is an exemplary illustration of a table showing examples of system selections and corresponding logic equations.

FIG. 3 is an exemplary illustration of controlling logic 300 for the switch 220. Logic inputs A, C, D, E, F, and G correspond to mobile communication device signals utilized by the controller 280. Outputs 1, 2, 3, and 4 correspond to signals indicating switch position to the switch 220. FIG. 4 is an exemplary illustration of a table 400 showing examples of system selections, switch positions, voltage references, and corresponding logic equations for operation of the controlling logic 300. This controlling logic 300 provides level shifting as well as decoding to provide the GaAs switch 220 with adequate gate voltage to maintain linearity. Level shifting also provides a means to accommodate different chipset logic levels at the GaAs switch. Controlling logic 300 may be performed by any suitable logic as known in the art. Modifications of the signals and logic of controlling logic 300 is necessary depending on the actual systems and applications of the front end module 120. For example, different signals and controlling logic 300 may be used for implementing the front end module 120 in different mobile communication devices and on different systems.

The controller 280 of FIG. 2 can control the operation of the mobile communication device 200. For example, the controller 280 can include similar components and operate in a similar manner to the controller 130 of FIG. 1. The controller 280 may include the switch decoder logic 300 or the switch decoder logic 300 may be implemented on an ASIC in the same package as the GaAs switch 220. Switch control inputs may be driven with a sufficiently high voltage to achieve a desired linearity. Any level shifting required to match voltage requirements may be performed on the ASIC along with decoding. Controlling signals for the decoding logic may be provided by standard IC's utilized with a standard mobile communication device which may be implemented within the controller 280. Any useful logic circuits may be implemented for decoding controller control signals for switching the switch 220 as is known in the art.

The controller operations of this invention are preferably implemented on a programmed processor. However, the controller operations may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the controller operations may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Accordingly, the preferred embodiments of the invention as set forth herein are intended to be illustrative, not limiting. Various changes may be made without departing from the spirit and scope of the invention.

What is claimed is:

1. A mobile communication device comprising:
    an antenna configured to receive a first signal in a first frequency band and a second signal in a second frequency band;
    first receiver circuitry configured to receive signals in the first frequency band;
    a switch having a first position; and
    a first diplexing network coupled to the antenna, the first diplexing network also coupled to the switch, and the first diplexing network also coupled to the first receiver circuitry,
    wherein the first diplexing network is configured to pass the signals in the second frequency hand to the switch,
    wherein the mobile communication device further comprises a second diplexing network coupled to the switch at the first position, the second diplexing network corresponding to the second frequency band, and
    wherein the first diplexing network, the second diplexing network, and the switch act in conjunction so that signals in the first frequency band are presented with an open circuit after the switch.

2. The mobile communication device according to claim 1, wherein the first diplexing network is configured to pass signals in the first frequency band to the first receiver circuitry and to block signals in the second frequency band from the first receiver circuitry.

3. The mobile communication device according to claim 1, further comprising second receiver circuitry coupled to the second diplexing network, the second receiver circuitry corresponding to the second frequency band.

4. The mobile communication device according to claim 1, further comprising first transmitting circuitry coupled to the second diplexing network, the first transmitting circuitry configured to transmit signals in the first frequency band.

5. The mobile communication device according to claim 1, further comprising a controller coupled to the switch, the controller being configured to make a handover decision when the first frequency band receiver detects the presence of a base station corresponding to the first frequency band.

6. The mobile communication device according to claim 1, further comprising a third diplexing network,
    wherein the antenna is further configured to receive a signal in a third frequency band,
    wherein the switch further has a second position, and
    wherein the third diplexing network is coupled to the switch at the second position.

7. The mobile communication device according to claim 6, further comprising a fourth diplexing network,
    wherein the antenna is further configured to receive a signal in a fourth frequency band,
    wherein the switch further has a third position, and
    wherein the fourth diplexing network is coupled to the switch at the third position corresponding to the fourth frequency band.

8. The mobile communication device according to claim 1, further comprising a first frequency bandpass filter coupled between the first diplexing network and the first receiver circuitry, the first frequency bandpass filter being configured to allow the signal in the first frequency band to pass from the diplexing network to the first receiver circuitry.

9. The mobile communication device according to claim 1, further comprising:
    a first frequency bandpass filter coupled to the second diplexing network; and
    a second frequency bandpass filter coupled to the second diplexing network,
    wherein the antenna is further configured to receive a signal in a third frequency band, and
    wherein the first frequency bandpass filter is configured to pass substantially only the second frequency band and the second frequency bandpass filter is configured to pass substantially only the third frequency band.

10. The mobile communication device according to claim 1, wherein the first frequency band corresponds to a frequency band centered around substantially 2110 MHz.

11. The mobile communication device according to claim 10, wherein the second frequency band corresponds to a frequency band of at least one of centered around substantially 900 MHz, centered around substantially 1900 MHz, and centered around substantially 1800 MHz.

12. The mobile communication device according to claim 1, further comprising a multilayer low-temperature cofired ceramic module.

13. A mobile communication device comprising:
   an antenna configured to receive a first signal in a first frequency band and a second signal in a second frequency band;
   a first diplexing network coupled to the antenna;
   a first frequency band receiver coupled to the first diplexing network; and
   a switch coupled to the first diplexing network, the switch having a first position;
   wherein the first diplexing network comprises an in-band impedance with respect to the first frequency band and an out of band impedance with respect to the second frequency band,
   wherein the first diplexing network is coupled between the antenna and the switch,
   wherein the mobile communication device further comprises a second diplexing network coupled to the switch at the first position, the second diplexing network corresponding to the second frequency band, and
   wherein the first diplexing network, the second diplexing network, and the switch act in conjunction so that signals in the first frequency band are presented with an open circuit after the switch.

14. The mobile communication device according to claim 13, wherein transmissions are received from a first base station in the second frequency band and a handover decision is made when the first frequency band receiver detects the presence of a second base station corresponding to the first frequency band.

15. The mobile communication device according to claim 13, wherein the switch is switched to a second position when the handover decision is made.

16. The mobile communication device according to claim 13, further comprising a multilayer low-temperature cofired ceramic module.

17. A mobile communication device comprising:
   a single antenna configured to receive a first signal in a first frequency band and a second signal in a second frequency band;
   a diplexing network directly connected to the antenna via a transmission line;
   a first frequency band receiver coupled to the first diplexing network; and
   a switch coupled to the first diplexing network, the switch having a first position;
   a controller coupled to the switch, the controller being configured to make a handover decision when the first frequency band receiver detects the presence of a base station corresponding to the that frequency band,
   wherein the mobile communication device further comprises a second diplexing network coupled to the switch at the first position, the second diplexing network corresponding to the second frequency band, and
   wherein the first diplexing network, the second diplexing network, and the switch act in conjunction so that signals in the first frequency band are presented with an open circuit after the switch.

18. The mobile communication device according to claim 17, further comprising a multilayer low-temperature cofired ceramic module.

* * * * *

UNITED STATES PATENT AND TRADEMARK OFFICE
CERTIFICATE OF CORRECTION

PATENT NO. : 6,912,406 B2
DATED : June 28, 2005
INVENTOR(S) : Lahlum, Ross et al.

It is certified that error appears in the above-identified patent and that said Letters Patent is hereby corrected as shown below:

Column 8,
Line 2, delete "hand" and replace with -- band --.

Signed and Sealed this

Twentieth Day of September, 2005

JON W. DUDAS
*Director of the United States Patent and Trademark Office*